United States Patent [19]

Gay

[11] Patent Number: 5,141,118

[45] Date of Patent: Aug. 25, 1992

[54] MULTIPLE CARRIAGE BASED RACK ASSEMBLY

[76] Inventor: Kenneth F. Gay, 241 Apache St., Westerville, Ohio 43081

[21] Appl. No.: 616,198

[22] Filed: Nov. 20, 1990

[51] Int. Cl.⁵ .............................................. A47F 5/00
[52] U.S. Cl. .................................. 211/151; 211/59.2
[58] Field of Search ............... 211/151, 59.2; 414/276, 414/286

[56] References Cited

U.S. PATENT DOCUMENTS

| | | | |
|---|---|---|---|
| 3,399,784 | 9/1968 | Buchbinder et al. | 211/151 |
| 3,900,112 | 8/1975 | Azzi et al. | 211/148 |
| 4,341,313 | 7/1982 | Doring | 211/151 |
| 4,372,451 | 2/1983 | Rasmussen et al. | 211/187 |
| 4,462,500 | 7/1984 | Konstant et al. | 211/151 |
| 4,613,270 | 9/1986 | Konstant et al. | 414/276 |
| 4,687,404 | 8/1987 | Seiz et al. | 414/276 |
| 4,773,546 | 9/1988 | Konstant | 211/151 |
| 4,915,240 | 4/1990 | Konstant | 211/151 |
| 4,949,852 | 8/1990 | Allen | 211/151 |
| 4,955,489 | 9/1990 | Allen | 211/151 |
| 4,988,251 | 1/1991 | Kinney | 211/151 X |

Primary Examiner—David M. Purol
Assistant Examiner—Sarah A. Lechok
Attorney, Agent, or Firm—Mueller and Smith

[57] ABSTRACT

A multiple carriage rack assembly is described wherein storage load supporting carriages are employed of consistent widthwise dimension. This consistent width is achieved through the utilization of a rolling suspension of the carriages on two rails which is designed such that the forwardly disposed wheels of one carriage ride upon a wheel receiving surface of a next forwardly adjacent carriage, while the rearward wheels of all carriages ride only upon the two rails. By providing rearwardly disposed, downwardly depending rear wheel support components of incrementally increasing lengths, the storage surfaces of the carriages remain mutually parallel and the carriages readily are nested at the front accessing and placement position within any given bay. The structure also permits the employment of a substantial number of carriages within a given bay of a warehousing racking facility.

19 Claims, 4 Drawing Sheets

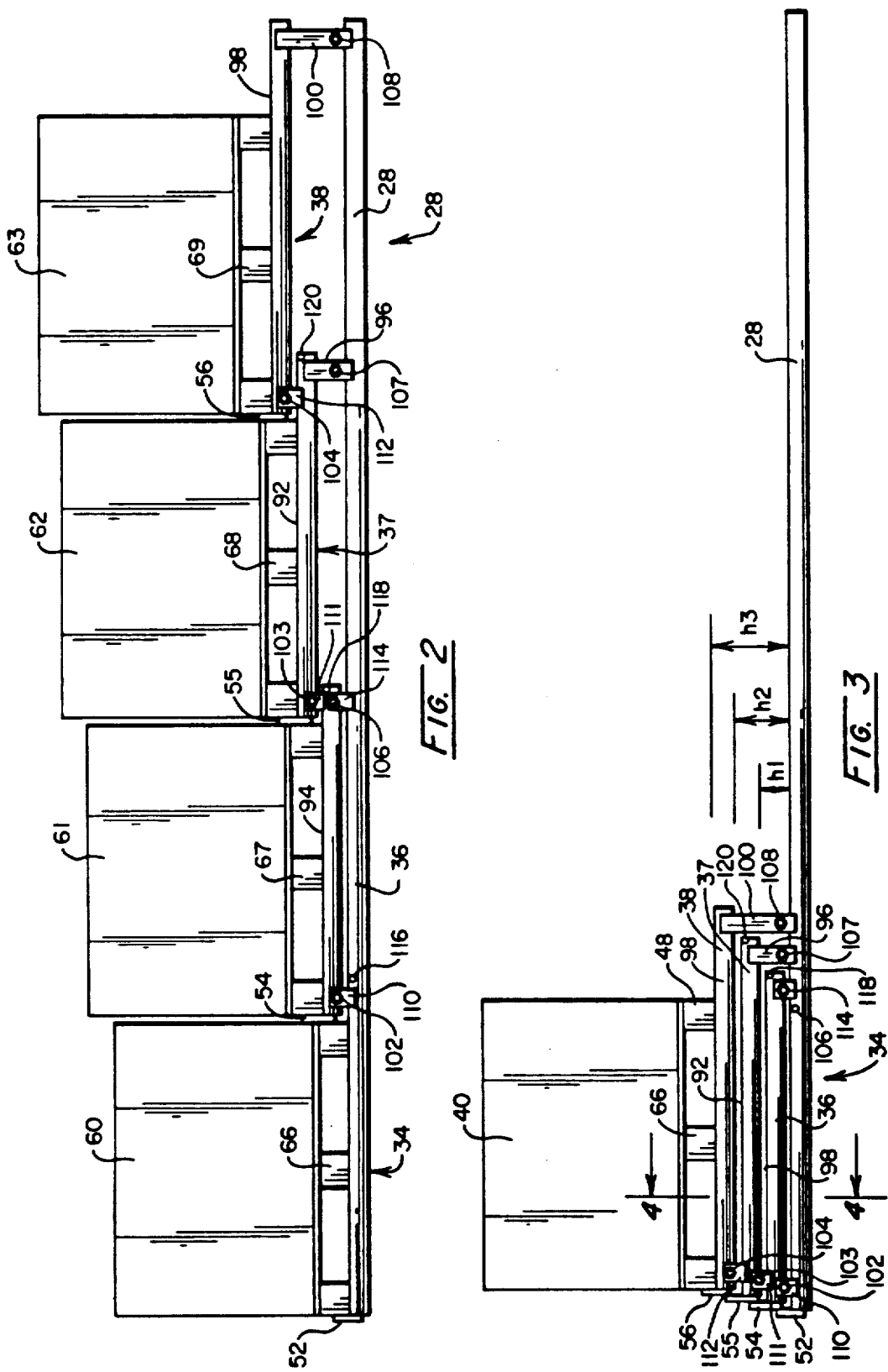

MULTIPLE CARRIAGE BASED RACK ASSEMBLY

BACKGROUND OF THE INVENTION

The warehousing of goods in the course of their movement within commerce is a procedure essentially as old as commerce itself. Dedicated warehouse facilities function within the goods distribution process and have varied widely in scope and complexity. Generally, as working space has become scarce, storage has become vertical, resort being made to a wide range of racks and shelves seeking to maximize the utilization of valuable floor space by resort to vertical space. As vertical storage has reached practical limits, as may be dictated by the effective reach of vehicles such as forklift trucks and the like, more warehouse space has been constructed with more floor space to meet expanding need.

Particularly where larger or heavier and more bulksome items have been stored, a palleting approach has been employed for goods movement and storage. With this approach, storage racks are provided with multiple levels of bays developed with an architecture of horizontal row supports and connected columnar uprights. An early rack storage system sometimes has been referred to as "drive in pallet racking", an approach wherein the stored containers or goods are palletized or mounted upon "skids" and lowered upon small, upright mounted mutually inwardly extending mounts or brackets by a forklift type warehousing vehicle. Such warehousing inefficiently consumes floor space. For example, each bay of the racks of such an arrangement is limited to one container or single load of goods and a floor space consuming aisle is required before each array of bays. Some floor space may be saved by situating the racks in a back-to-back formation, but, as warehousing demands and costs have increased, the above approach has commenced to fall from industry favor. However, this technology of utilizing vertical working space as developed in conjunction with drive in pallet racking has importantly contributed to the efficiency of warehousing.

To achieve a higher level of efficiency of floor space utilization, a variety of storage rack structures have been developed having extended depths so that containers can be stored at more than one location within each bay of the rack structure. To access the expanded depths of the bay, trolley-like structures have been developed which are biased towards the face or accessing end of the bay either by gravitation through the use of sloping tracks or the like, or by motorized or resilient biasing systems. In general, when a first load is positioned within such bay, it is placed upon a trolley and remains at the access opening of the bay until a second load is inserted. That second load then pushes the first trolley mounted loading rearwardly. During an unloading or picking procedure, the opposite activity ensues to provide for a last in, first out (LIFO) accessing procedure. Typically for this picking procedure, the trolley mounted packages are induced to move to the pick position by the noted gravitational arrangement.

To further expand the depthwise capacity of the bays, a variety of "forward flow" developments looking to the use of multiple trolleys or the like riding within a bay have been witnessed. The implementation of such multiple trolley systems requires, however, that each load containing trolley or movable support be successively movable to the front access face or picking position of the bay for loading and pick-up procedures. Thus, trolley nesting has been employed wherein each trolley platform has a unique widthwise or horizontal extent such that a next inwardly disposed device nests over the next forwardly disposed device and all, when the bin is empty, are located at the accessing front of the bay. In effect, when the bays are empty, a vertical stack of the movable load carrying devices is presented. However, for each succeeding load supporting stage of such system, horizontal space is expended and, thus, valuable warehouse floor space is lost. For a typically large warehouse facility, that loss will become substantial. Another limitation accrues with the use of the currently evolved forward flow systems in that they are limited by the number of trolleys or carriers which can be practically nested forwardly. In general, about three to six such carrying components remain the limit of depth based capacity, depending upon the particular design involved. Another drawback to the currently developed nesting forward flow systems resides in a lack of uniformity in the sizes of each trolley employed in a multiple storage station system, as well as in the need for elaborate rail arrays and the like to accommodate for the trolleys of varying sizes. The devices also are limited in the locations in which they can be installed. Generally, it is desirable that all vertical space within a warehousing facility be used. This involves storage over access doors and the like which heretofore has been somewhat limited, principally due to the noted depth and width limitations of current forward flow systems.

Many existing warehouse facilities have been constructed having the noted early developed drive-in pallet racking systems which are structured to retain palletized goods using pallets of preset widthwise dimensions. To upgrade these structures to a more efficient LIFO gravitational forward flow approach, the pre-established pallet and bay widths have heretofore severely limited bay depth, for example to one trolley. As a consequence, the upgrading of older warehousing racking to utilize more efficient storage techniques generally has been precluded. To achieve an efficient retrofitting of these older facilities to provide extended bay depth with an expanded number of storage stations gained from forward flow based carrier systems, the width of the carrier transport systems within each bay for each station must be maintained essentially constant even though all such carrier devices must be stackable at the access opening of each bay for forklift truck provided loading and picking operations.

Of course, it is particularly desirable that any retrofit system or, in fact, any newly employed forward flow multiple station storage system be fabricable with uniform, commonly dimensioned components to achieve concomitant savings in fabrication costs, as well as in developing a modularity facilitating their ease of installation gained through a commonality of parts.

SUMMARY

The present invention is addressed to an improved storage rack system and associated stored item positioning assembly which exhibit enhanced versatility permitting use of a greater number of storage stations for each bay of a rack system, as well as providing for an improved, more efficient utilization of warehouse floor area. In consequence of a design wherein standardized load moving and storing carriages are provided having constant widthwise dimensions, not only is floor space utilization rendered more efficient, but also the carriage-based positioning assemblies are effectively employed to retrofit earlier rack systems to a substantially more efficient storage performance.

In their general structure, the assemblies of the invention employ multiple and stackable carriages which ride upon only two, rack or bay mounted rails. Each carriage incorporates two front wheels spaced to engage a wheel receiving surface formed upon the upper surface of a next, forwardly adjacent carriage. Correspondingly, the rearwardly disposed wheels of the carriages engage the two, rack mounted rails. By incorporating downwardly depending rear wheel mounting components of incrementally increasing lengths, the load receiving surfaces of progressively succeeding carriages are incrementally higher within a given bay-contained assemblage. However, the widthwise extent of each carriage remains identical and constant, permitting maximized bay storage area utilization. The widthwise uniformity of the carriage structures also contributes to the efficiency of their manufacture and assembly. Consistent, incremental variations in component sizing permits a modular approach to the design and assembly of the systems, thus enhancing the practicality of their employment both in new racking structures and in the retrofitting-based improvement of existing warehouse racking facilities.

Another feature of the invention provides a stored item positioning assembly for use with a storage bay having a front access opening and extending rearwardly therefrom to a rear storage location. The assembly includes a support structure extending from the front access opening to the rear storage location, as well as first and second spaced parallel elongate rails mounted upon the support structure extending substantially from the access opening to the rear storage location and each having an upwardly disposed wheel support surface. A front storage station having a front flat load receiving portion is located adjacent to and extending from the access opening. These wheel receiving surfaces may be the upper surfaces of the rails themselves. A first carriage having a first flat receiving portion of select widthwise extent of height, h1, above the first and second rails is provided for supporting a load for storage and has two mutually laterally spaced, forwardly disposed wheels, each positioned to engage one of the wheel support surfaces and to support the first receiving portion. The carriage additionally has two rearwardly disposed wheels, each positioned to engage one of the first and second rails and which is located to support the first receiving portion and the first flat receiving portion includes upwardly disposed first wheel receiving surface regions located over and aligned with the forwardly and rearwardly disposed wheels. A second carriage is provided having a second flat receiving portion of the select widthwise extent for supporting a load for storage at a height, h2, above the first and second rails, the second carriage including two mutually laterally spaced, forwardly disposed wheels in supportive, rotational engagement with the first wheel receiving surface regions, two rearwardly disposed wheels, each in supportive rotational engagement with one of the first and second rails, the forwardly and rearwardly disposed wheels locating the second receiving portion substantially at the height, h2, and having upwardly disposed second wheel receiving surface regions over and aligned with the forwardly and rearwardly disposed wheels thereof.

Another feature of the invention provides a storage rack having a plurality of bays for storing loads, each bay having a front access opening and extending rearwardly therefrom to a rear storage location, each bay being configured having a predetermined bay width. The rack includes a support structure extending from the front access opening to the first storage location and having a predetermined slope directed downwardly from the rear storage location. First and second spaced, parallel elongate rails are mounted upon the support structure, extend to the rear storage location and each having an upwardly disposed wheel support surface. A front storage station is supported by the support structure and has a front, flat load receiving portion of predetermined width which is located adjacent to and extends from the front access opening and has upwardly disposed spaced wheel receiving surfaces. A first carriage having a width coextensive with the predetermined width, and upwardly disposed first flat receiving portion for supporting a load for storage, two, spaced, forwardly disposed wheels supporting the first receiving portion and reciprocably movably engaged with the front storage station wheel receiving surfaces, two rearwardly disposed wheels supporting the first receiving portion, each positioned to engage an upwardly disposed wheel support surface one of the first and second rails, and including upwardly disposed first wheel receiving surface regions disposed over and aligned with the two forwardly and rearwardly disposed wheels. A second carriage is provided having a width coextensive with the predetermined width, a second upwardly disposed flat receiving portion for supporting a load for storage, two spaced, forwardly disposed wheels supporting the second receiving portion, and reciprocably movably supported upon the first wheel receiving surface regions, two rearwardly disposed wheels supporting the second receiving portion, each positioned to engage one of the first and second rails and configured with the forwardly disposed two wheels to locate the second receiving portion over and in substantially nestable relationship with the first receiving portion.

Other objects of the invention will, in part, be obvious and will, in part, appear hereinafter.

The invention, accordingly, comprises the apparatus and system possessing the construction, combination of elements and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 2 is a partial side view of one storage bay within the rack structure of FIG. 1;

FIG. 3 is a side view of another storage bay of the rack structure of FIG. 1 showing carriages therewithin in a forwardly disposed nested orientation;

DETAILED DESCRIPTION OF THE INVENTION

Figure 1:
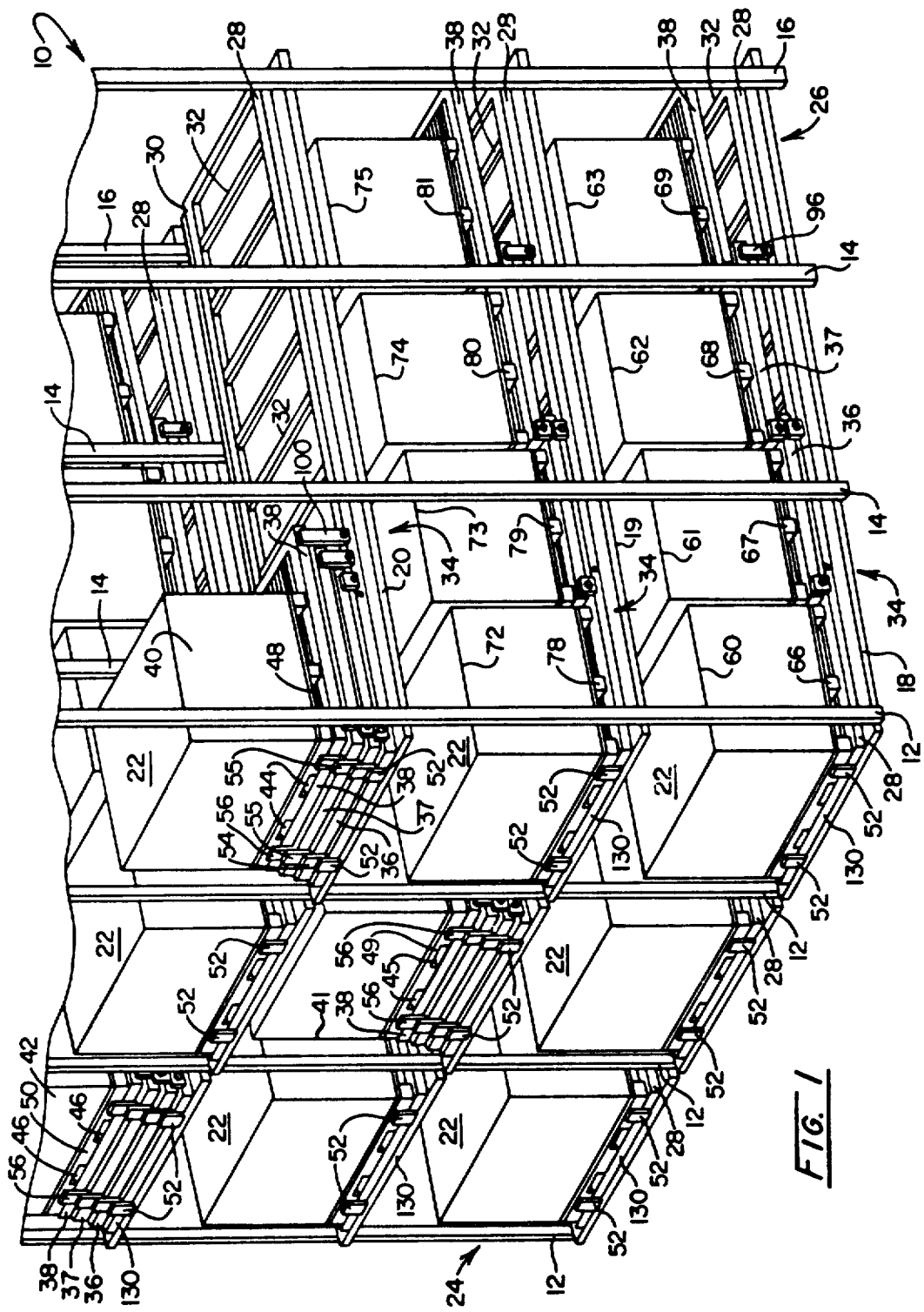
FIG. 1 is a partial perspective view of a racking system according to the invention showing a plurality of storage bays with multiple storage positions.

Referring to FIG. 1, a storage rack or warehousing rack assembly is revealed in partial perspective fashion in general at 10. Rack 10 is seen to be formed in conventional fashion as a rectilinear assemblage of uprights or columns commencing with forwardly disposed uprights 12, behind which are located intermediately disposed uprights 14 and terminating with rearwardly disposed uprights 16. Between these columns or uprights there are connected support platforms or similar transversely oriented structures which, commencing with the lowermost disposed ones of which are revealed at 18 through 20. These platforms as at 18-20 may assume a wide variety of structural configurations. Thus they are revealed only in generalized fashion. With that assemblage, a plurality of adjacently disposed bays represented generally at 22 and having a somewhat elongate rectangular configuration extending from their front access openings at the front region represented generally at 24 to rear storage locations represented generally at 26. Typically, an aisle or open space will be provided in front of the front region 24 so that warehousing vehicles such as forklift trucks or the like may have access to each of the bays 22 for picking or placing loads, i.e. items to be stored. The present invention includes a stored item positioning assembly for use with the bays 22 which permits the positioning of a substantial number of loads within the bays in a last in first out (LIFO) accessing arrangement.

In general, each of the bays 22 is configured so that the support platform or structures, as represented generally at 18-20 are connected to the uprights 12, 14, and 16 such that they have a predetermined slope extending downwardly from the rear storage location 26 to the front access region 24. The degree of slope imparted to these platforms is selected in consideration of the weight of the loads involved, as well as the rate of forward flow movement of the system desired. Positioning of the platforms 18-20 is quite simple, the rearward portion thereof at rear storage location 26 being bolted to uprights as at 16 at a desired ramping position and, correspondingly, the front portions of the platforms 18-20 being bolted to the forwardly disposed uprights 12. Following such assembly, the platforms 18-20 then are bolted at their positions of adjacency with the intermediate uprights 14. Upon each of the platforms or structures 18-20, there then are mounted two parallel spaced rails 28 and 30 which extend essentially from the rear storage position 26 to the front access location 24. These rails are shown further supported by transverse support members of the platforms, certain of which are identified at 32. Rails 28 and 30, as they extend from the forward access openings of bays 22, serve to define a front storage station as generally represented at 34, at which each load initially is placed and at which position the last load of a full bay is located. The stored item positioning assemblies used with rack 10 are illustrated herein as accommodating four load or storage stations and, in keeping with that number of stations, are seen to incorporate three load supporting carriages represented generally at 36-38 which, when a given bay is unloaded, will be nestably positioned at the front storage station 34 and when fully loaded, will respectively occupy the second, third, and fourth storage stations, the latter station essentially being at the rear storage location 26. These storage locations will vary somewhat depending upon the depthwise size of the palleted loads being retained on the carriages.

Where only a singular stored item or load is located within a bay 22, for example as shown at 40, 41, and 42, then, that load 40, 41, or 42 will be positioned upon carriage 38 as it is located on the top of the nested grouping of carriages 36-38 at the front storage station 34. Generally, placement is provided by a lift fork truck or the like, the fork tines of which are engaged within corresponding slots as at 44 and 46 within respective pallets 48 and 50. The nested carriages 36-38 at this front storage station 34 are restrained from movement by a combination of paired upstanding stops 52 which are fixed to the support structures or platforms 18-20 through forwardmost supports 32 of associated rails 28-30. Under nesting conditions, the stops 52 abuttably contact mutually abutting and cascaded upstanding paired stops 54-56 which are affixed to and extend upwardly from respective carriages 36-38. Where a bay becomes fully loaded with four items for storage or loads as represented by loads 60-63 positioned, respectively, upon pallets 66-69 and loads 72-25 positioned, respectively, upon pallets 78-81 in the adjacent forwardly displayed bays 22, then the carriages are moved rearwardly by virtue of the successive positioning of pallets and associated loads upon the carriages in the sequence of carriage 38, carriage 37, and carriage 36. Finally, the final load, as at 60 and 66 is located at the front storage station 34. As the loads are removed, they progress under gravitational force to the access or front storage station 34 for being picked up by the warehousing vehicle.

Turning to FIG. 2, loads 60-63 as mounted upon respective pallets 66-69 again are revealed. Note that load 60 and its associated pallet 66 are located at the front storage station 34 and, as such, essentially are sitting upon rails 28 and 30, only rail 28 being shown in the figure. The next load 61, the third load to be placed within the bay, and its associated pallet 67 are seen positioned upon carriage 36. To so position the load 61, load 60, and its associated pallet 66 were moved inwardly within the bay to cause pallet 66 to strike the paired stops 54 of carriage 36 and move the carriage 36 rearwardly along with carriages 37 and 38. Looking now to load 62 and its associated pallet 68, as positioned upon carriage 37, note that paired upstanding stops 55 have been engaged by pallet 67 to move the assemblage supported by carriage 37 rearwardly. Carriage 37 is seen to be supported at an elevation wherein its upwardly disposed flat receiving portion or surface 92 is above the corresponding receiving portion 94 of pallet 36 and is in a parallel planar relationship therewith. The elevation of receiving portion 92 of carriage 37 is retained at an appropriate height above rail 28 by virtue of having two mutually laterally spaced forwardly disposed wheels (not shown) which engage wheel receiving or supporting surfaces at the outer edges of the upper surface of carriage 36. This elevation then is maintained by virtue of two, spaced downwardly depending rear wheel support components, one of which is revealed at 96 in FIG. 2. The structure 96 is somewhat simple, being columnar or straight and having a height permitting the positioning of receiving portion or surface 92 in parallel with the upper surface of rails 28 and 30. The extent of forces imposed upon components as at 96 are somewhat minimal, representing the weight of one load, or one-half of the load present upon surface 92 plus one-half of the load upon the next carriage 38. A similar load distribution occurs at the forward edges of the carriages. As a consequence of such structure geometry, relatively minor moments are imposed upon devices 96 and they are, thus, configured in the nature of a downwardly depending cantilever.

In similar fashion, carriage 38 is seen having an upwardly disposed receiving portion at surface 98 which carries a load 63 positioned upon a pallet 69. Stop 56 is seen having been engaged in an abutting relationship with pallet 68 of load 62, and the assemglage of carriage 38 and load 63 has been pushed rearwardly to the rear storage location 26. Note that the final location of the carriage 38 is somewhat dependent upon the depthwise dimensions of loads 60-62. In this regard, the rearwardly disposed carriage will roll forwardly upon the wheel receiving surfaces of a forwardly disposed next adjacent carriage to the extent of the depth of a next preceding load or pallet.

Figure 6:
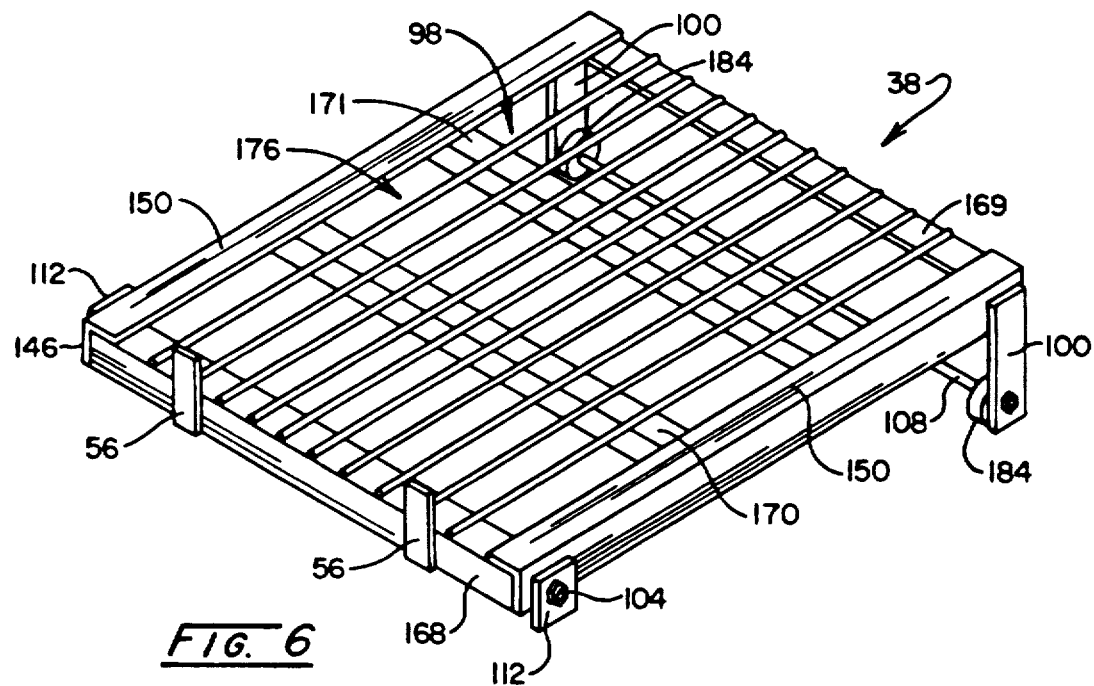
FIG. 6 is a perspective view of a carriage component of the apparatus of the invention.

Note that carriage 38, in similar fashion as carriage 37, contains a pair of spaced rear wheel support components, one of which is revealed at 100. Both such components 100 are seen in FIG. 6. Component 100 functions with the forward wheels of carriage 38 which are riding upon a wheel receiving surface essentially at the top surface 92 of carriage 37, to maintain receiving portion or surface 98 in parallel with the top surface of rails 28 and 30. As before, the component 100 supports a wheel, and due to the minimal moment encountered with the dynamics of movement of the system, may be provided in the structurally simple cantilever manner shown. For heavy loads, of course, a rearwardly depending buttressed, downwardly dependent structure may replace components as at 100.

The pair of forwardly disposed wheels for each of the carriages 36-38 are hidden in the view of FIG. 2 but are mounted upon respective forward axles 102-104. Similarly, the axles providing support for the paired rearwardly disposed wheels of carriages 36-38 are supported by respective rearward axles 106-108. Additionally retained by the forward axles 102-104, are respective forward guide members which, for the side represented in FIG. 2, are revealed respectively at 110-112. Guide member 110 and its oppositely associated guide member, extend outwardly over the outwardly disposed surfaces of rails 28 and 30 and serve to maintain the forwardly disposed wheels of carriage 36 upon those rails. In similar fashion, guide 111 and its associated oppositely disposed guide, function to retain the forward wheels of carriage 37 upon appropriate wheel receiving surfaces of carriage 36. In similar fashion, guide member 112 of carriage 38 retains the paired forwardly disposed wheels of that carriage upon the wheel receiving surfaces of carriage 37. Note, that the guide members 110-112 extend downwardly over the surface of the outwardly disposed side members of the frames forming carriages 36-38. To provide rearward guiding, oppositely disposed guide members, one of which is revealed at 114, are retained by bolted connection to carriage 36 at axle 106. Note that member 14 extends downwardly over an outer surface of rail 28 and its upward extent is limited so as to permit the passage thereover of forward guide member 111. In similar fashion, the rear wheel support pairs, as at 96, extend downwardly over their associated rail, as component 96 extends over the side of rail 28 to provide rear wheel guidance. As before, component 96 is seen to terminate at its upward extent at a distance or location selected to permit passage thereover of forward guide member 112 connected to axle 104 of carriage 38. Finally, rear wheel support pairs as at 100 are seen to extend downwardly beyond axle 108 to provide a downwardly associated rail guide member extending over the outwardly disposed side of rail 28, to provide a rear wheel guiding function for carriage 38. The rearward travel of carriages 36-38 is restricted to maintain their position within an associated bay, as well as to assure the continued positioning of the front wheels of a rearward carriage upon the wheel receiving surfaces of a forwardly adjacent carriage. This restriction is simply provided by small, outwardly protruding stops extending from the carriage frame side member. These stops are paired, being positioned on each side of a carriage, or in the case of stopping carriage 36, being positioned on rails 28 and 30. FIG. 2 shows one such stop being provided as a protruding pin 116 extending from rail 28. Pin 116 and its opposite counterpart limit the rearward travel of carriage 36 by abuttably engaging guide member 110 and its respective opposite counterpart. Paired pin stops, one of which is shown at 118 extend from the rearward portion of the frame of carriage 36 to abut corresponding guides as at 103 of carriage 37 and limit or establish the maximum extent of its rearward travel. Finally, paired pin-like stops, one of which is shown at 120 extend from the rearward portion of carriage 37 to abuttably engage guide 112 of carriage 38 to limit the maximum extent of its rearward travel.

It may be noted in FIG. 2, that the depthwise or lengthwise extent of carriages 37 and 38 are each incrementally longer than the corresponding depthwise length of carriage 36. This incremental lengthening of carriages as they are intended for more rearwardly disposed storage stations, accommodates for the important nesting of the carriages at the front access or storage station 34. Looking to FIG. 3, a side view representation of the load 40 and its associated pallet 48 is revealed as they are positioned upon the receiving portion of rearward storage station carriage 38 while that carriage is uppermost in the nestable stack thereof at access or front storage station 34. Note that in this orientation, paired stop members 52 which are affixed to the rail 28-30, support structure 32 have served to retain the assemblage at position 34 by abutment against the corresponding pair of stops 54 extending upwardly from the frame of carriage 36. Similarly, paired stops 55 of carriage 37 abutt stops 54 and paired stops 56 of carriage 38 abutt stops 55. The incrementally increasing lengths or depthwise dimensions of carriages 37 and 38 permit the rearwardly disposed nesting of rearward wheel support components 96 and 108. FIG. 3 reveals the advantage of the cantilever based simplicity of this structure as permitting nestability of these rearward support components. Finally, it may be observed that the select dimensioning of the upwardly disposed extent and downwardly disposed extent of front wheel guide pairs, one side of which are shown at 110 and 111 permit paired guides, one of which is shown at 111, to pass over paired guides 110 and the paired guides, one of which is shown at 112 pass over paired guides, one of which is shown at 111.

FIG. 3 further reveals that there is a relative gain in height of each carriage in the progression from front to rear as represented by the dimensions h1, h2, and h3 representing the heights of the respective receiving platforms 94, 92, and 98. In general, the height h2 will be about twice that of height h1 and height h3 will be about the value h2 incremented by the value h1.

Figure 4:
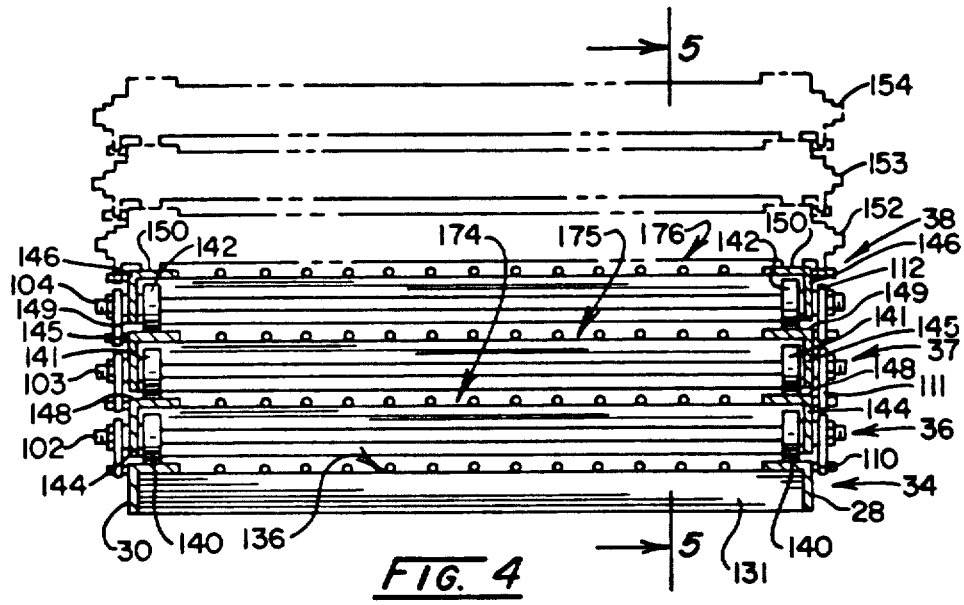
FIG. 4 is a sectional view taken through the plane 4—4 in FIG. 3.

Referring to FIG. 4, a sectional view of the nested configuration of FIG. 3 is revealed. In the figure, storage station 34 is shown formed of parallel rails 28 and 30 beneath which are connected cross supports, one of which is shown at 131. Along those cross supports are welded an array 136 of rods or rod-like members which serve to support loads, for example, load 60 and pallet 66 as shown at FIG. 2. Looking additionally to FIG. 5, the angle-form cross supports supporting rod array 136 and which, in turn, are fixed to rails 28 and 30, are revealed at 130-133.

Returning to FIG. 4, front axles 102-104 are seen to rotatably support respective paired forwardly disposed carriage wheels 140-142. Axles 102-104, in turn, are supported from peripherally disposed rectangular frames which includes paired parallel side members. Axles 102-104 are secured along with respective guide members 110-112, to the side members 144-146 by bolted connections as shown. The paired, parallel side members for carriages 36-38 are shown respectively at 144-146. The uppermost surface of the angle shaped paired side members 144-146 form wheel receiving regions for receiving and supporting the wheels of an upwardly disposed carriage. For example, wheel receiving surface or region 148 of carriage 36 supports paired wheels 141 of carriage 37. Similarly, the spaced wheel receiving regions 149 of carriage 37 support the paired wheels 142 of carriage 38. In turn, the spaced wheel receiving regions 150 of carriage 138 serve to receive the forwardly disposed wheels of a next successive carriage shown in phantom at 152. The same association continues for essentially any number of carriages, for example those shown in phantom at 153 and 154. As is apparent, the number of carriages employed is limited only by the extent of practical vertical space available to the user.

Figure 5:
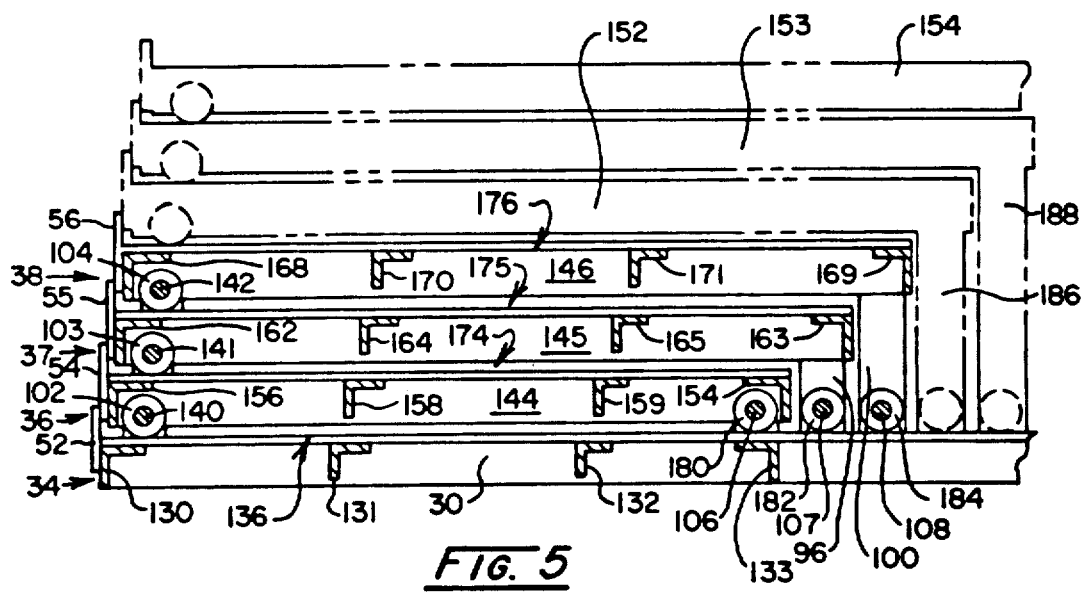
FIG. 5 is a partial sectional view taken through the plane 5—5 in FIG. 4.

Looking again to FIG. 5, rectangular peripheral frame or carriage 36 additionally includes steel angle front and rear cross members shown respectively at 156 and 157 as well as intermediate angle cross members 158 and 159. The peripheral cross members supporting side members 141 of carriage 37 are shown including front cross member 162 and rear cross member 163 intermediate which are provided cross members 164 and 165. In similar fashion, side members 146 of carriage 37 are supported by steel angle transverse front cross member 168 and a similar rear cross member 169. Intermediate cross members 170 and 171 complete the frame structure. FIGS. 4 and 5 reveal arrays of rods or rod-like structures 174-176 which are welded to the transverse members of the respective carriages 36-38 to provide a load receiving region or surface.

FIG. 5 reveals the rearwardly disposed axles 106-108 within respective carriages 36-38. While axle 106 is supported from side members 144 of carriage 36 and, in turn, supports paired rear wheels, one of which is revealed at 180, carriages 37 and 38 incorporate respective downwardly depending rear wheel support components shown, respectively, at 96 and 100. These components, in turn, support respective rear axles 107 and 108. Axle 107 supports paired rear wheels, one of which is revealed at 182, while axle 108 supports paired rear wheels, one of which is represented at 184. All rear axles are retained in position by bolts (see FIGS. 1, 2, 3, and 6).

As revealed additionally in FIG. 5, additional carriages, for example those shown in phantom at 152-154 can be combined essentially in relatively larger numbers with the system as represented, for example, at phantom depicted carriages 152-154. Note that carriage 152 incorporates paired rear wheel support components as at 186 which are incrementally longer to accommodate its nesting orientation. In particular, the length of component 186 will be larger by about the above-noted value, 1h. In similar fashion, a still longer wheel support component pair would be associated with a next carriage as is shown in phantom at 153, one such support component being revealed at 188.

Turning to FIG. 6, carriage 38 is shown in perspective as typical of those structured in accordance with the invention. The figure reveals the paired assemblage, for example, of front wheel guides 112 and rear wheel supports 100. Additionally, the front cross member as well as rear member 168 and rear cross member 169 are shown coupled to side members 146 in a manner wherein the wheel receiving surfaces of regions 150 are positioned on top of the uppermost flange of those transverse components. Thus, the array of rods 176 may be welded to the stepped down flat upper face of components 168 and 169. In similar fashion, connections are made to the intermediate transverse components 170 and 171. Connection of the components forming the carriages preferably is by bolting. However, other forms of connection such as welding and the like are available. Because of the incremental but regular dimensioning of the components of each of the carriages, they are readily fabricable and shipped from central manufacturing entities in a modular form for construction at the site of their use. Of particular importance to their construction, it may be noted from FIG. 4 that the widthwise dimensions of the carriages remain constant along with the spacing and sizing of their rolling components. FIG. 4, for example, reveals that the front wheel pairs of carriages 36-38 as represented, respectively, at 140-142, are in vertical alignment. This aligned verticality of components and uniformity in widthwise dimensions of all components of the carriages permit their ideal application to retrofitting existing rack or bay structures which may have been developed at an earlier point in time for single storage location drive-in racking structures. With the instant invention, such structures may be revised to provide an efficient, multi-stage flow through storage system at practical costs.

Figure 7:
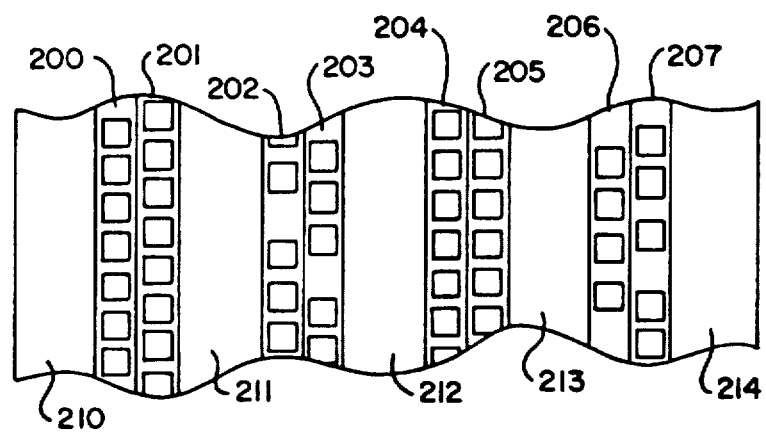
FIG. 7 is an overhead schematic representation of a prior art rack storage system.
Figure 8:
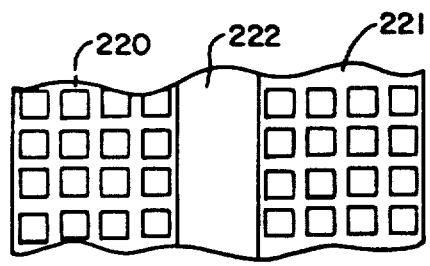
FIG. 8 is an overhead schematic representation of a rack system according to the invention.

The advantages of providing a forward flow storage implementation in rack structures resides in the savings of valuable floor area in warehousing facilities. Where widthwise dimensions are maintained constant without waised lateral space, as with the present system, floor space is saved and the multiple carriage system, while utilizing some vertical space, has a space allocation which is the least expensive of that within a warehouse. FIGS. 7 and 8 reveal the advantages accruing with forward flow rack systems for warehousing wherein the number of storage stations within a bay is increased. For example, FIG. 7 reveals a conventional drive-in pallet racking arrangement wherein single storage station racks as at 200-207 are arranged in an efficient back-to-back orientation such that bays 200 and 201 are back to back; bays 202 and 203 are back-to-back; bays 204 and 205 are back-to-back; and bays 206 and 207 are back-to-back. For a warehouse vehicle such as a forklift truck to access these single storage station bays 200-207, space or aisles as represented at 210-214 generally are required. These five aisles 210-214 consume a substantial amount of valuable warehouse floor space, thereby derrogating upon the efficiency otherwise available with forward flow systems. Where those forward flow systems are provided, as shown in the above discourse, a substantial efficiency in utilizing expensive warehouse floor space can be achieved. For example, where a forward flow system contains only four storage stations, a racking arrangement is shown at FIG. 8 is established. In the warehousing design of FIG. 8, two rack structures 220 and 221 are arranged to mutually face a singular aisle 222. All storage stations within the rack 220 and 221 are accessible by warehousing vehicles from the aisle 222 on a last in first out (LIFO) basis. It may be noted that the number of storage stations which are available with the arrangement of FIG. 8 is equivalent to the number represented at FIG. 7 with substantial savings in warehouse floor space. The same savings can be achieved with the multiple forward flow storage position assemblages of the invention by positioning the racking structures in otherwise unused portions of typical warehouses. These heretofore unused warehouse location will include, for example, regions over door openings. With such arrangements, the racking structures are supported upon columns which permit ingress and egress through the building doors while permitting use of the vertical space above those access regions.

Since certain changes may be made in the above-described system and apparatus without departing from the scope of the invention herein involved, it is intended that all matter contained in the description thereof or shown in the accompanying drawing shall be interpreted as illustrative and not in a limiting sense.

I claim:

1. A stored item positioning assembly for use with a storage bay having a front access opening and extending rearwardly therefrom to a rear storage location, comprising:
   a support structure extending from said front access opening to said rear storage location;
   first and second spaced, parallel elongate rails mounted upon said support structure, extending substantially from said access opening to said rear storage location and each having an upwardly disposed wheel support surface;
   a front storage station having a front flat load receiving portion located adjacent to and extending from said access opening;
   a first carriage having a first flat receiving portion of select widthwise extent at height, h1 above said first and second rails for supporting a load for storage, having two mutually laterally spaced, forwardly disposed wheels, each positioned to engage one said wheel support surface and to support said first flat receiving portion, and having two rearwardly disposed wheels, each positioned to engage one said first and second rails located to support said first flat receiving portion, and said first flat receiving portion including upwardly disposed first wheel receiving surface regions located over and aligned with said forwardly and rearwardly disposed wheels; and;
   including a second carriage having a second flat receiving portion of said select widthwise extent for supporting a load for storage at a height, h2, above said first and second rails, said second carriage including two, mutually laterally spaced, forwardly disposed wheels in supportive, rotational engagement with said first wheel receiving surface regions, two, rearwardly disposed wheels, each in supportive rotational engagement with one said first and second rails, said forwardly and rearwardly disposed wheels locating said second flat receiving portion substantially at said height, h2, and having upwardly disposed second wheel receiving surface regions over and aligned with said forwardly and rearwardly disposed wheels thereof.

2. The assembly of claim 1 in which the said select widthwise extent of said first carriage first flat receiving portion substantially corresponds with the widthwise extent of said first and second rails.

3. The assembly of claim 1 in which:
   said support structure includes an upwardly depending first stop member positioned at said front access opening;
   said first carriage is of rectangular profile, having a peripherally disposed rectangular frame including a transversely forwardly disposed front frame member; and
   including a second stop member fixed to and upwardly extending from said front frame member and positioned to abuttably engage said first stop member of said support structure.

4. The assembly of claim 3 in which said first carriage includes front guide means outwardly disposed from said frame at a forward location thereon located a predetermined distance below the surface of said first flat receiving portion and extending a predetermined distance below the lowermost extent of said forwardly disposed wheels, for retaining said forwardly disposed wheels upon said wheel support surface of said first and second rails while permitting corresponding front guide means of a next succeeding carriage to pass thereover to derive a mutually nesting association of carriages.

5. The assembly of claim 1 in which said first carriage includes a rectangular frame formed of steel members having upwardly disposed, flat horizontal surfaces; and said first flat receiving portion includes a parallel array of rod-like members fixed to and extending along said frame at the upper region thereof.

6. The assembly of claim 1 in which said first carriage means includes rear guide means extending downwardly from the rearwardly disposed sides of said first flat receiving portion in the vicinity of said rearwardly disposed wheels and extending over the outwardly disposed side surfaces of said first and second rails for retaining said rearwardly disposed wheels upon said wheel support surface of said first and second rails while permitting a mutually nesting association of carriages.

7. The assembly of claim 1 in which said second carriage is configured such that said height, h2, is about twice said height, h1.

8. The assembly of claim 1 in which said second carriage includes two rear wheel support components fixed to and extending substantially downwardly from each rearmost corner of said second carriage second flat receiving portion for rotatably supporting said rearwardly disposed wheels and each having a height selected to substantially position the rearward region of said second flat receiving portion at said height, h2.

9. The assembly of claim 8 in which said second carriage rear wheel support components are configured having a guide portion extending downwardly over the outwardly disposed side surface of an adjacently outwardly disposed side surface of said first and second rails for retaining said rearwardly disposed wheels upon said wheel support surface of said first and second rails.

10. The assembly of claim 8 in which:
    each said first and second carriage is of rectangular profile, having a peripherally disposed, rectangular frame including respective, transversely forwardly disposed first and second front frame members; and
    each said first and second carriage includes respective first and second stop members fixed to and extending upwardly from respective said first and second front frame members and positioned to mutually abuttably engage upon the movement of said second carriage over said first carriage to establish a nesting association thereof over said first storage station.

11. The assembly of claim 10 in which each said rectangular frame of said first and second carriages includes oppositely disposed parallel side members, each extending substantially over a said first and second rail and having an upwardly disposed elongate surface for providing said first and second wheel receiving surface regions at respective said first flat receiving portion and said second flat receiving portion.

12. The assembly of claim 11 in which said second carriage includes two rear wheel support components fixed to and extending substantially downwardly from each rearmost corner of said second carriage second flat receiving portion for rotatably supporting said rearwardly disposed wheels and each having a height selected to substantially position the rearward region of said second flat receiving portion at said height, h2.

13. A storage rack having a plurality of bays for storing loads, each bay having a front access opening and extending rearwardly therefrom to a rear storage location, each bay being configured having a predetermined bay width and comprising:
    a support structure extending from said front access opening to said rear storage location and having a predetermined slope directed downwardly from said rear storage location;
    first and second spaced, parallel elongate rails mounted upon said support structure, extending to said rear storage location and each having an upwardly disposed wheel support surface;
    a front storage station supported by said support structure, having a front flat load receiving portion of predetermined width located adjacent to and extending from said front access opening and having upwardly disposed spaced wheel receiving surfaces;
    a first carriage having a width coextensive with said predetermined width, an upwardly disposed first flat receiving portion for supporting a load for storage, two, spaced, forwardly disposed wheels supporting said first flat receiving portion and reciprocally movably engaged with said front storage station wheel receiving surfaces, two rearwardly disposed wheels supporting said first receiving portion, each positioned to engage a said upwardly disposed wheel support surface of one said first and second rails, and including upwardly disposed first wheel receiving surface regions disposed over said two forwardly and rearwardly disposed wheels; and
    a second carriage having a width coextensive with said predetermined width, an upwardly disposed second flat receiving portion for supporting a load for storage, two spaced forwardly disposed wheels supporting said second flat receiving portion and reciprocably movably supported upon said first wheel receiving surface regions, two rearwardly disposed wheels supporting said second flat receiving portion, each positioned to engage one said first and second rails and configured with said forwardly disposed two wheels to locate said second flat receiving portion over and in substantially nestable relationship with said first flat receiving portion.

14. The storage rack of claim 13 in which:
    said second carriage includes upwardly disposed second wheel receiving surface regions disposed over said second carriage two forwardly and rearwardly disposed wheels; and
    including a third carriage having a width coextensive with said predetermined width, an upwardly disposed third flat receiving portion for supporting a load for storage, two spaced forwardly disposed wheels supporting said third flat receiving portion and reciprocably movably supported upon said second wheel receiving surface regions, two rearwardly disposed wheels supporting said third flat receiving portion, each positioned to engage one said first and second rails and configured with said forwardly disposed two wheels to locate said third flat receiving portion over and in substantially nestable relationship with said second flat receiving portion.

15. The storage rack of claim 14 in which said first and second carriages include downwardly depending, columnar wheel support components extending from the rearwardly disposed portions thereof and coupled with said rearwardly disposed wheels, each said support having a length selected for positioning said second and third flat receiving portions in mutually parallel spaced apart association for providing said nestable relationship between said second and third flat receiving portions.

16. The storage rack of claim 15 in which each said first, second and third carriage includes a stop member fixed to and extending upwardly from the forwardly disposed edge of respective said first, second, and third flat receiving portions, said stop members being engagable in mutually abutting contact when said first, second and third carriages are positioned in mutually nesting relationship.

17. The storage rack of claim 16 in which:
    each said first, second and third carriages includes respective peripherally disposed, rectangular first, second and third frames, each having parallel, oppositely disposed side members extending along the length thereof;
    said second carriage includes second front guide means outwardly disposed from said second frame at a forward location thereon, located a second predetermined distance below the said second flat receiving portion and extending a predetermined distance below said forwardly disposed wheels and slideably engagable with said side members of said first frame, for retaining said forwardly disposed wheels in alignment upon said first carriage first wheel receiving surface regions; and said third carriage includes third front guide means outwardly disposed from said third frame at a forward location thereon, located at a second predetermined distance below the said third flat receiving portion and extending a predetermined distance below said forwardly disposed wheels and slideably engagable with said side members of said second frame, for retaining said forwardly disposed wheels in alignment upon said second carriage second wheel receiving surface regions.

18. The storage rack of claim 17 in which said second front guide means second predetermined distance location and said third front guide means predetermined extension distance below said forwardly disposed wheels are selected for permitting the passage of said third front guide means over said second front guide means.

19. The storage rack of claim 18 in which:

said first carriage includes first front guide means outwardly disposed from said first frame at a forward location thereon, located a first predetermined distance below the said first flat receiving portion and extending a predetermined distance below the lowermost extent of said forwardly disposed wheels, for retaining said forwardly disposed wheels upon said first and second rails; and said first front guide means first predetermined distance location and said second front guide means predetermined extension distance below said forwardly disposed wheels are selected for permitting the passage of said second front guide means over said first front guide means.

* * * * *